INVENTORS
M.K. TESTERMAN
P.C. MC LEOD

BY

ATTORNEYS

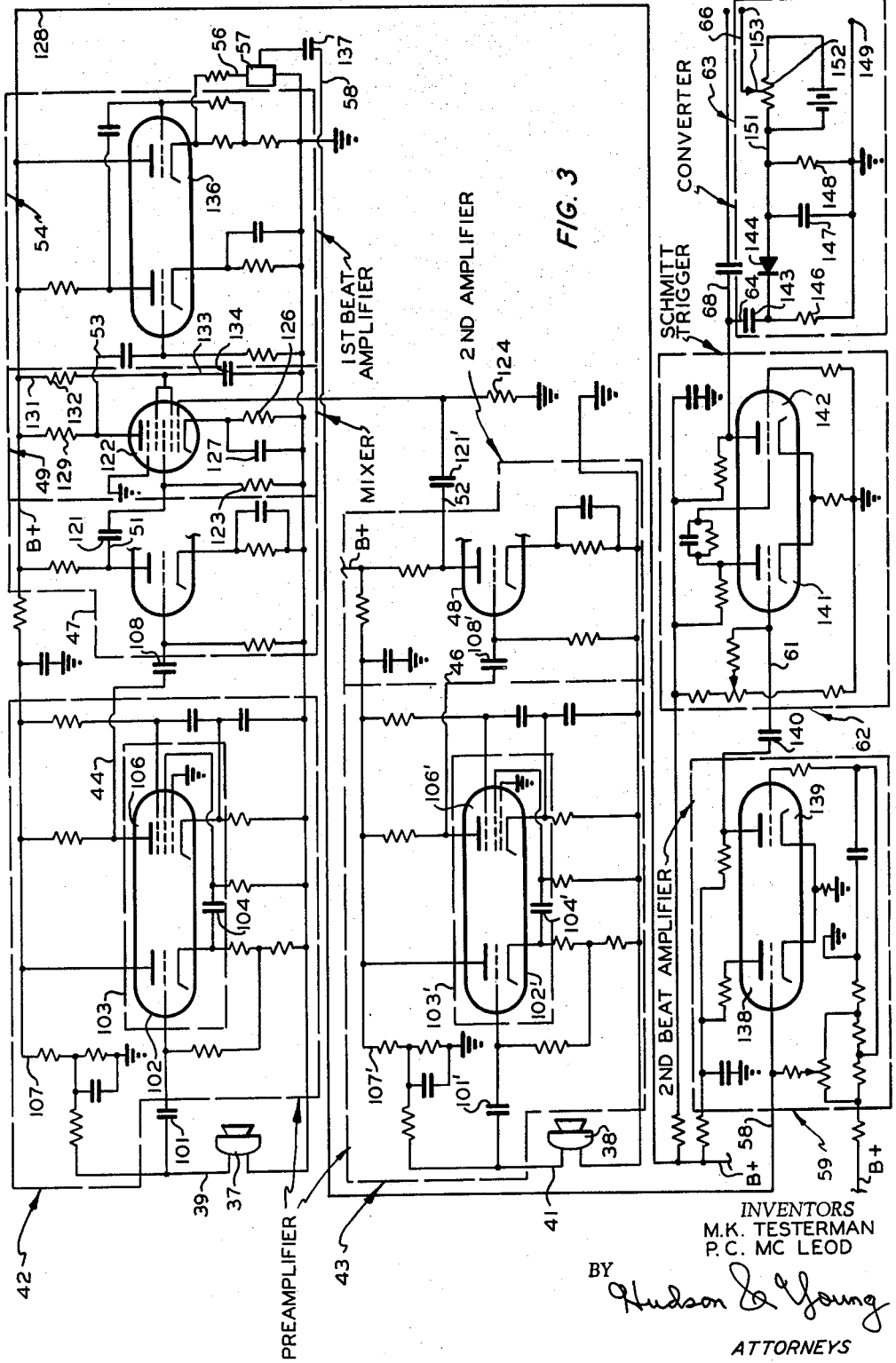

3,144,762
COMPOSITION SENSING TRANSDUCER
Maurice K. Testerman and Paul C. McLeod, Little Rock, Ark., assignors to Phillips Petroleum Company, a corporation of Delaware
Filed July 3, 1961, Ser. No. 121,491
2 Claims. (Cl. 73—23.1)

This invention relates to analysis of the composition of fluid. In another aspect it relates to a frequency generator for a chromatographic analyzer which utilizes the variation in output frequency with the nature of the fluid passing therethrough.

Gas chromatography is a known method of analyzing fluid samples by preferential sorption and desorption. The desirability of using chromatography for such specific uses as fractionation (multi-stage distillation) control has been recognized for some time. Conventionally, as the segregated constituents of the fluid sample emerge from the sorption column, they are suitably detected through the sensing of characteristic properties, commonly such as thermal conductivity, density, refractive index, and infrared absorption, which identify the several components and measure the relative amounts thereof.

The prior art discloses acoustical apparatus for use in conjunction with detection of fluid constituents by gas chromatography. They entail the broad concept of electro-mechanically forced resonance on dual gas chambers to transmit sound through confined gases, one a reference gas and the other of variable composition. Some detection devices are allegedly based on change in mass flow through chambers with respect to time; however, we have found that this theory cannot be experimentally verified with the prior art devices. In fact, such devices show gross deviations from linearity when applied to chromatographic analysis of hydrocarbon samples up through the normal range of sample concentration in carrier gas.

In the newer, high speed chromatographs, employing quite small sorption columns, operating flow rates are quite low, on the order of a few milliliters per second. The prior art devices which depend on changes in mass flow are simply not of sufficient sensitivity in the range of gas flow rates employed in newer chromatographs.

We have devised a wave generating device which operates on the principle of the conservation of energy in flowing jets. When the flow of a jet stream is interrupted near the orifice, the feedback from the interrupting element opposes the jet stream and has a tendency to lift the jet as a whole above the obstruction. The feedback will be pulsating and, consequently, the intersection of the jet stream and the feedback stream will oscillate between the orifice and the obstructon increasing the natural frequency. Stated in other terms, the angle of deflection of the jet stream changes in magnitude between a maximum and minimum value, resulting in undulating pressure over the flowing jet. Thus it will be seen, our oscillations are produced by a molecular mechanical type of feedback.

These undulations, however, although purely dependent upon the change in energy content between kinetic and potential of the jet stream have an amplitude insufficient to activate a high-frequency pick-up device, such as a condenser microphone. By placing a cavity below and perpendicular to the flowing jet, and in cooperation with a jet edge, a signal of sufficient amplitude to be readily detectable is obtained. Operating in this manner the device generates sufficient power to activate a condenser microphone, located directly above the flowing jet stream.

When gases of higher molecular weights are introduced into a carrier gas stream, there is a corresponding slowdown in the average molecular velocity of the system. This is because the kinetic energy for the carrier gas molecules is equaled by the kinetic energy of the heavier molecules, all being part of the same system.

Since the natural undulations depend upon the periodic interchange of energies between kinetic and potential states, the net effect of these energy interchanges is manifested by a periodic change in direction around an average deflection of the flow gas stream in the generator of this invention.

The instant generator has a number of advantages including simple construction, good sensitivity to composition change, linear response to all gases and vapors, the low time constant needed in high speed chromatography and a wide dynamic range, e.g., detection of 0–100 percent methane sample concentration when using helium as the carrier gas.

In one embodiment, our invention comprises a pair of wave generator devices, each being located in a separate gas-tight chamber, one device disposed to permit the passage therethrough of a sample-charged carrier gas, and the other device serves as a reference cell with only carrier gas continuously passing therethrough. They are identical in structure, with one producing a variable ultrasonic frequency, which is determined by the variable tension in the flowing gas of varying composition at is passes through the orifice. The other generator produces a constant reference frequency due to only pure carrier gas, under steady conditions, flowing in the reference cell. The two ultrasonic frequencies are first converted to corresponding electrical frequencies by pick-up devices, such as microphones. Next, the resulting electrical signals have their impedances matched, by means of cathode followers into amplification systems, wherein each is amplified sufficiently to drive a heterodyning means. The resulting difference frequency, or beat frequency, is amplified, filtered, then reamplified, to be fed into a Schmitt trigger, which supplies the digital output to a standard counter, and/or the trigger feeds the signal to a digital-to-analog converter; the latter, in turn, supplies an analog output to a convential recorder.

Either way, the beat signal is registered and represents the instantaneous concentration of the sampled constituent in the sample-charged carrier gas stream. Integrating these instantaneous signals over the elution period of the sampled constituent results in a number which represents the volume percent of the constituent in the hydrocarbon charged to the analyzer.

In another embodiment, the Schmitt trigger is omitted, and the reamplifying means is designed to have sufficient gain to "square up" the signal. The digital output or input signal for the converter may be taken off at this point.

Accordingly, it is an object of this invention to provide a composition sensing transducer circuit for a high speed, chromatographic analyzer.

Another object of the invention is to provide a composition detector capable of deriving its energy of actuation solely from the energy content of a small volume of flowing gas.

A further object of this invention is to provide means for converting the mechanical output of the frequency generator to an electrical signal whose impendance can be matched to conventional amplifying means.

It is another object to provide a composition detector which utilizes variation in the output frequency of an ultrasonic generator caused by changes in the energy content of the jet stream of sampled gases passing therethrough as a measure of their presence and concentration.

Yet another object is to provide a composition detector which has good sensitivity and linear response to composition changes for two-component gas systems.

Still another object is to provide a hydrocarbon composition detector which has the short time constant required in high speed, vapor phase chromatographic analysis, giving inherent digital data created inside the detector.

A yet further object is to provide a chromatographic analyzer which inherently gives digital output from the detector component thereof.

Other objects, advantages and features of our invention will be apparent from a study of the accompanying disclosure, appended claims and drawing, in which:

FIGURE 3 is a detailed schematic circuitry of the composition sensing transducer circuit of this invention;

Figure 1:
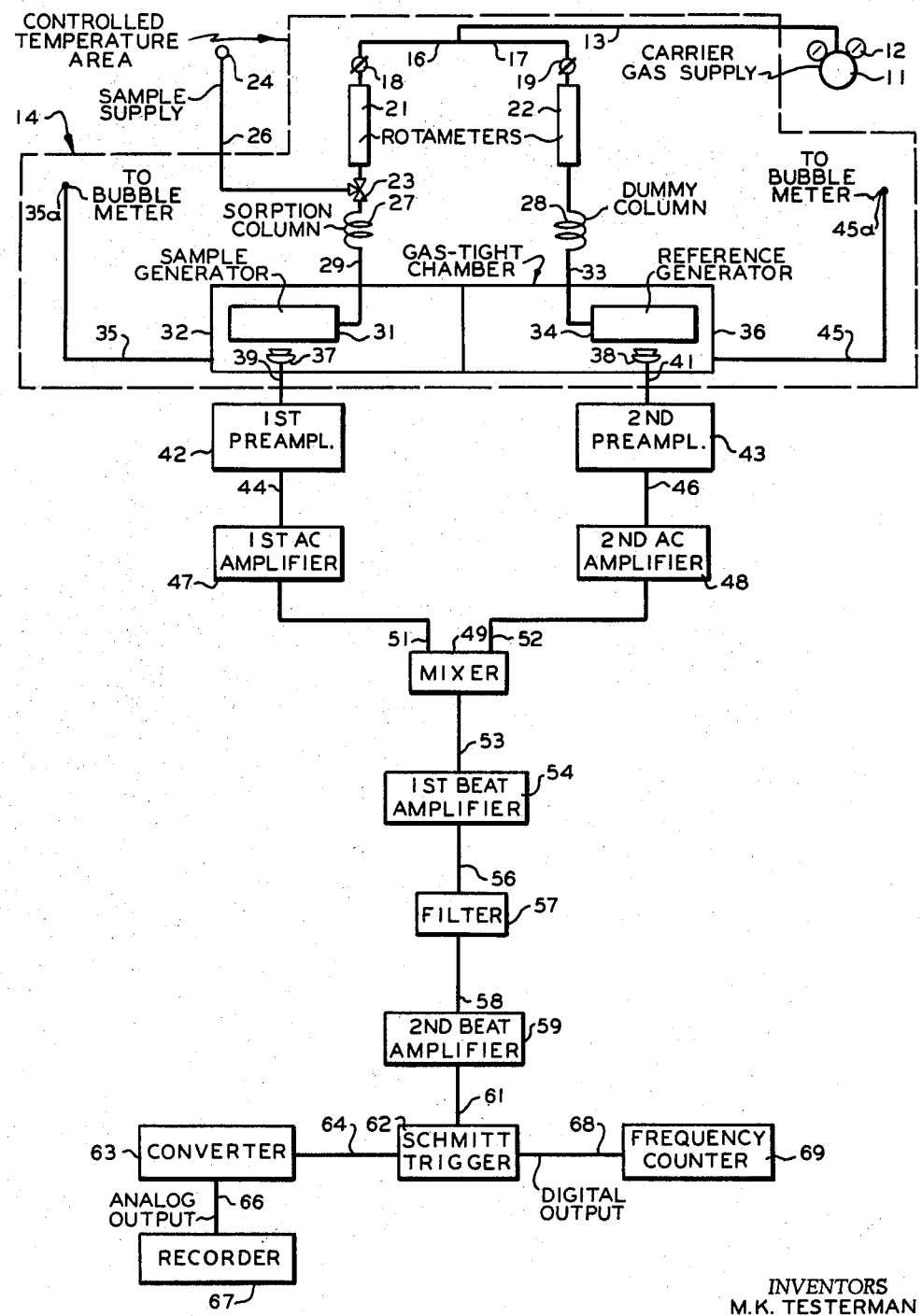
FIGURE 1 is a schematic diagram of the chromatographic analyzer embodying the composition sensing transducer circuit of this invention.

Referring now to the drawing in detail, where like parts have been designated with like reference numerals, there is shown a carrier gas supply 11, provided with a flow regulator 12, and having an outlet conduit 13 serving as a carrier gas feed line entering controlled temperature area 14, which is thermostatically controlled. Source 11 provides a carrier gas stream with a flowing pressure in the range 15 to 50 p.s.i.g. Conduit 13 divides into two conduits 16 and 17, each having a flow regulator, 18 and 19 respectively, disposed therein. Two rotameters, 21 and 22, are next in line giving an indication of gas flow rate. A fluid sampling valve 23, such as disclosed in patent application Serial No. 20,765, filed April 7, 1960, of E. Guenther, is located downstream of rotameter 21. Sample supply source 24 communicates with valve 23 via conduit 26. Sorption column 27, filled with an appropriate sorbent, usually in pulverized form, is located downstream of sampling valve 23. Dummy sorption column 28 is used on the reference line to act as a buffer for the system. In this manner, the flow and conditions of the gases at the generator inlets are matched.

Conduit 29 from column 27 enters wave generator, or sample side 31, located within gas-tight chamber 32, sample-charged carrier gas being jetted through generator 31, as described subsequently. By enclosing the generators in separate chambers, they can be readily purged to 100 percent carrier gas, achieving a very stable frequency reference signal. Similarly, conduit 33 enters reference side 34 located in gas-tight chamber 36, with pure carrier gas being jetted through generator 34. Chambers 32 and 36 are provided with outlet vents 35 and 45, respectively, for venting the gas streams which flow from generators 31 and 34, through more precise, soap bubble type, flow meters 35a and 45a, respectively. The gas-tight chambers are of very rigid construction to eliminate external vibrations, including room noise.

Pick-up means, specifically microphones 37 and 38, are located adjacent the two jet streams of generators 31 and 34, one within each of chambers 32 and 36 respectively. They convert the pressure vibrations in the column of gas above the jet stream to a corresponding electrical signal. Capacitor-type microphones are among those suitable for this energy conversion step.

Electrical lead 39 communicates between microphones 37 and first cathode follower and preamplifier 42. Similarly, lead 41 communicates between microphone 38 and a second cathode follower and preamplifier 43. The two signals are matched into the impedance of the main amplifiers. Leads 44 and 46 communicate between the preamplifiers and two A.C. amplifying circuits, 47 and 48, respectively, which amplify the first and second electrical signals sufficiently to drive a heterodyning means, or mixer 49, via leads 51 and 52.

Mixer 49 yields a difference, or beat, frequency, that changes in value with the change of frequency of the ultrasonic wave emitted by sample side generator 31. This frequency output is, of course, determined by the change in composition of the vaporized sample in carrier gas passing from sorption column 27 to sample generator 31. The beat frequency signal from mixer 49 passes via lead 53 into a first beat amplifier 54, which increases the signal amplitude. The amplified beat signal passes via lead 56 through a 10 kilocycles per second, low pass, filter 57, which attenuates all frequencies above about 10,000 c.p.s. from the beat signal output. The filtered signal passes via lead 58 to a second beat amplifier 59, which reamplifies the same. This amplifier may be designed to provide sufficient gain so as to "square up" the signal; thus, the digital, and analog (if desired), outputs may be taken off at this point.

As shown in FIGURE 1, it is preferable to connect amplifier 59 via lead 61 with a Schmitt trigger 62, which is designed to suppress electrical noise and present constant-amplitude pulses to the digital-to-analog converter 63 via lead 64. The analog output from converter 63 passes via lead 66 to a recorder 67. Concurrently, or alternatively, the digital output from trigger 62 passes via lead 68 to a frequency counter 69.

Figure 2:
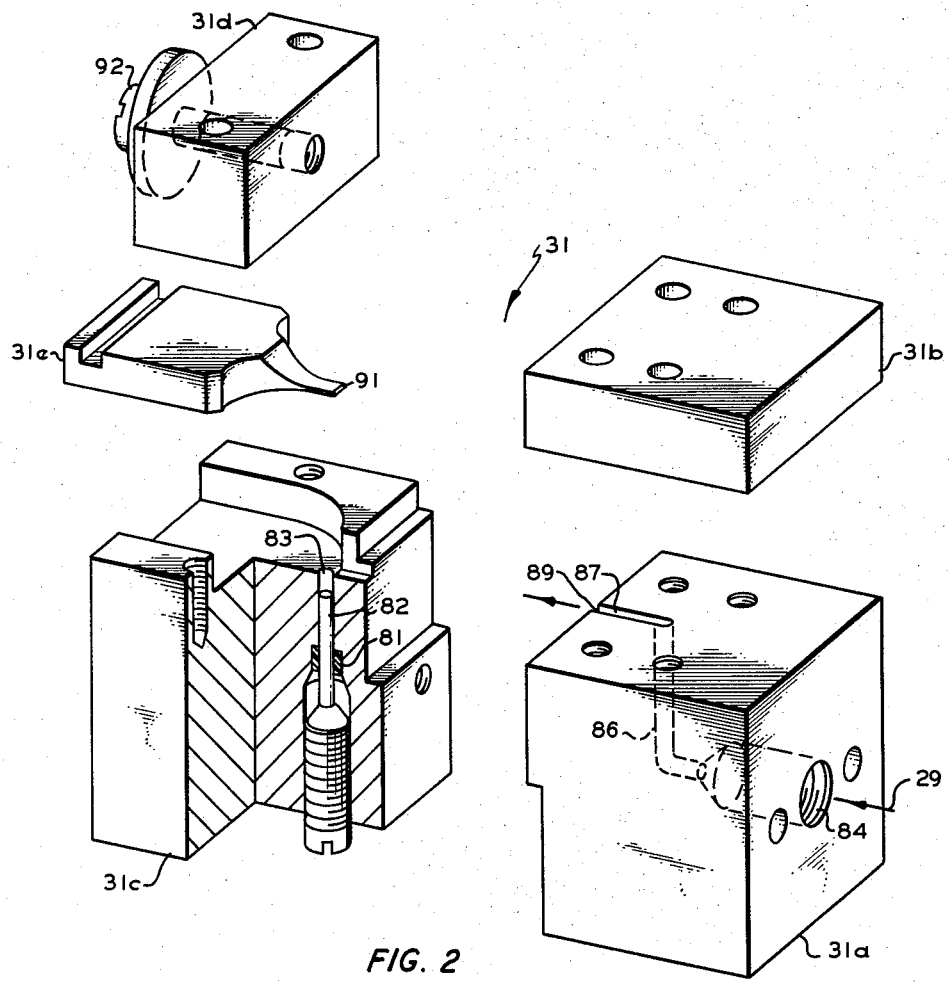
FIGURE 2 is an exploded perspective view in partial section of one of the frequency generators employed in this invention.

In FIGURE 2 is shown a perspective view, in partial section, of the ultrasonic frequency wave generator of this invention. As the generator is identical in structure, whether used on the sample or reference side of FIGURE 1, only one generator will be described in detail, in the interest of brevity.

Wave generator 31 comprises several adjacent rectangular blocks, each provided with appropriate passages and channels. Composite block 31 is constructed entirely of a metal that is corrosion resistant, such as 303 Stainless Steel. A collar, composed of Teflon, a thermosetting polymer marketed by the Du Pont Company, serves as a seal 81 around the wire 82 which forms the closed end of resonant cavity 83 in component block 31c.

Sample-charged carrier gas enters component body 31a horizontally from conduit 29, via threaded passage 84. The gas stream is under a flowing pressure in the range 2 to 7 p.s.i.g. The gas stream turns upward into vertical passage 86, then turns again in a horizontal direction into orifice passage 87, which is formed by a groove in the upper face of body 31a and is closed by upper body 31b. Passage 87 serves as a straightening vane leading to the orifice. A metal-to-metal seal only is used around the orifice to maintain the orifice smooth and clean. Thus, it may be taken apart and reassembled without altering its dimensions. The gas stream emerges from orifice 89, flows across resonant cavity 83 and impinges on jet edge 91 and resonant cavity 83, whereby the natural energy undulations in the jet stream become easily detectable.

The length of the resonant cavity (RCL), and the distance between orifice 89 and jet edge 91 (JED), are both variable. The RCL is preferably in the range between 0.125 and 0.650 centimeter, while the JED varies between 0.05 and 0.20 centimeter. The orifice width was held constant at 0.066 centimeter, but the orifice height may be varied considerably, so that the width to height ratio is in the range from 5 to 25. The orifice height may also be varied by machining.

For the block shown, the particular dimensions were:

|  | Centimeter |
|---|---|
| Orifice (width by height) | 0.066 x 0.0066 |
| Resonant cavity length | 0.417 |
| Resonant cavity diameter | 0.066 |
| Jet edge distance: |  |
| (A) | 0.169 |
| (B) | 0.19 |
| Jet edge width | 0.0845 |
| Jet edge thickness | 0.037 |

A resonant cavity diameter (RCD) of 0.066 centimeter appears to afford good frequency stability, combined with the smallest effective resonant cavity volume (RCV) possible, to permit prompt flushing out after sample passage therethrough.

The volume of resonant cavity can be made quite small since it results from the drilling of a small hole in block 31c. Under normal operating conditions, the total cell volume was only a few microliters, all of which results in a short time constant of detection of composition change, on the order of ten milliseconds, so vital to high speed analyzers. The JED is adjusted by manipulation of cap screw 92 disposed in body 31d, which retains the jet-edged plate 31e in proper spaced relation, as desired, relative to orifice 89.

In calibrating with a particular gas, one first sets the JED, then the flow rate is adjusted to the value desired. Finally, the RCL is adjusted to optimize the frequency, that is, to give it the maximum amplitude for pick-up.

As an example, when operating on helium as carrier gas, the output frequency of the sample side decreases about 220 cycles per second (c.p.s.) for each one percent of methane impurity in the sample-charged carrier gas, when the base frequency of the pure carrier gas is 41,000 c.p.s. This would means a 22,000 c.p.s. change for 0 to 100 percent methane concentration in the sample side, for the following values of the parameters: Corrected helium flow rate, 3.41 ml./sec.; RCL, 0.417 cm. and JED of 0.169 cm.

It is known that the time constant can be reduced by using a less viscous carrier gas. For this reason hydrogen has been tested. It was found that the aforedescribed generator operates most effectively from a base frequency of 50,000 c.p.s. with hydrogen, the output frequency decreasing about 1200 c.p.s. for each percent of methane impurity in the hydrocarbon-containing carrier stream. This is sufficient to cause a beat frequency of 24,000 c.p.s. for a 20 percent methane concentration in the detector, which presents no real problem since sample concentration in carrier gas will rarely exceed 20 volume percent. Thus, the beat frequency will never become on the order of the basic operating frequency.

In FIGURE 3 is shown a detailed schematic of the composition sensing transducer circuit. Lead 39 connects microphone 37, preferably of the capacitor type, with a first cathode follower and preamplifier circuit, generally designated 42. Lead 39 couples through condenser 101 to the triode section 102 of triode-pentode 103, such as a 6U8 vacuum tube. Triode section 102 functions as a cathode follower, the output of which is coupled by means of condenser 104 to the control grid of the pentode section 106 of tube 103.

A potential is supplied via B+ source 128 to capacitor-type microphones 37 and 38. Electrical signals produced in said microphones are applied to the grids of cathode followers 102 and 102' via condensers 101 and 101', respectively. A signal from the cathode of triode section 102 is amplified in pentode section 106, which serves as a preamplifier, and produces a positive-going, amplified, squared wave signal from the anode thereof, via lead 44, through coupling condenser 108, to a first alternating current amplifier, generally designated 47, such as one section of a 12AU7 vacuum tube.

The further amplified signal leaves the anode of triode 47, via lead 51, and is coupled through condenser 121 to heterodyning means, or mixer, 49.

Lead 41 connects microphone 38, identical to microphone 37, with a second cathode follower and preamplifier circuit, generally designated 43. Lead 41 couples through condenser 101' to the triode section 102' of triode-pentode 103', such as a 6U8 vacuum tube. Triode section 102' functions as a cathode follower, the output of which is coupled by means of condenser 104' to the control grid of pentode section 106' of tube 103'.

A signal from the cathode triode section 102' is amplified in pentode section 106', which serves as a preamplifier, and produces a positive-going, amplified, squared wave signal coupled via lead 46 and coupling condenser 108' to a second alternating current amplifier such as the second section of the 12AU7 tube of amplifier 47, here generally designated 48.

The further amplified signal leaves the anode of triode 48, via lead 52, through coupling condenser 121' and connects with mixer 49. Thus, preampifier 43 serves the same signal shaping and amplifying purpose for the signal from microphone 38, as does cathode follower 42 for microphone 37.

Reference is now made to mixer 49. Lead 51 from the first preamplifier passes to the third grid of pentagrid 122, which grid is grounded through resistor 123. Lead 52 passes from the second preamplifier to the first grid of pentagrid 122, which grid is also grounded through resistor 124. The cathode of pentagrid 122 is connected to ground through resistor 126, which as shunted by condenser 127. B+ source 128 supplies the anode of pentagrid 122 with a positive potental through resistor 129. Source 128 also supplied a biasing potential to the second and fourth grids of pentagrid 122 through lead 131 and resistor 132. The second and fourth grids are also connected to ground via lead 133, through condenser 134, while the fifth grid is grounded.

A difference, or beat, frequency passes from the anode of pentagrid 122, via lead 53, to a first, two-stage, beat amplifier 54. The second stage 136 of amplifier 54 serves as a cathode follower, which places the output voltage in phase with the output signal from the transducers 37 and 38.

The amplified, beat signal passes via lead 56 through a low-pass, filter 57, which removed any ripples in the amplified beat signal. A suitable filter for this use is United Transformer Company LMI 10,000, or its equivalent.

A filtered, amplified, beat signal passes via lead 58, having condenser 137 disposed therein, to the control grid of the first triode section 138 of a second beat amplifier 59. Amplifier 59 is a parallel, two-stage amplifier, such as a 12AX7 vacuum tube. A signal from the anode of second section 139 therein is coupled via lead 61, and condenser 140, to the control grid of first triode section 141 of Schmitt trigger 62.

The output from trigger 62 is suitable for direct use in a digital counter, digital computer, or the like, such as 69, passing thereto via lead 68. Simultaneously, this same signal may be converted to an analog signal, via lead 64, using a digital-to-analog converter 63.

Converter circuit 63 is fed by the amplified voltage from the anode of second triode section 142, connecting via lead 64. The output signal from section 142 is a series of pulses of one polarity, representing the beat frequency produced in mixer 49.

Converter circuit 63 consists of a coupling condenser 143, and a rectifier 144, such as an IN648, with the junction therebetween connected to ground through resistor 146. The rectified signal is filtered by condenser 147, and parallel resistor 148, both of which are connected across the output. Lead 151 connects with one junction of potentiometer 152, the contacts 153 of which connects via lead 66 with the positive analog output terminal 153. The analog output connects to a recorder, controller, or the like.

For purposes of simplicity, description of a conventional positive power supply, connected to positive terminal 128, typically 300 volts D.C. has been omitted, as well as the power supply for the heater elements of the vacuum tubes, all of which are well understood by those skilled in the art.

Figure 4:
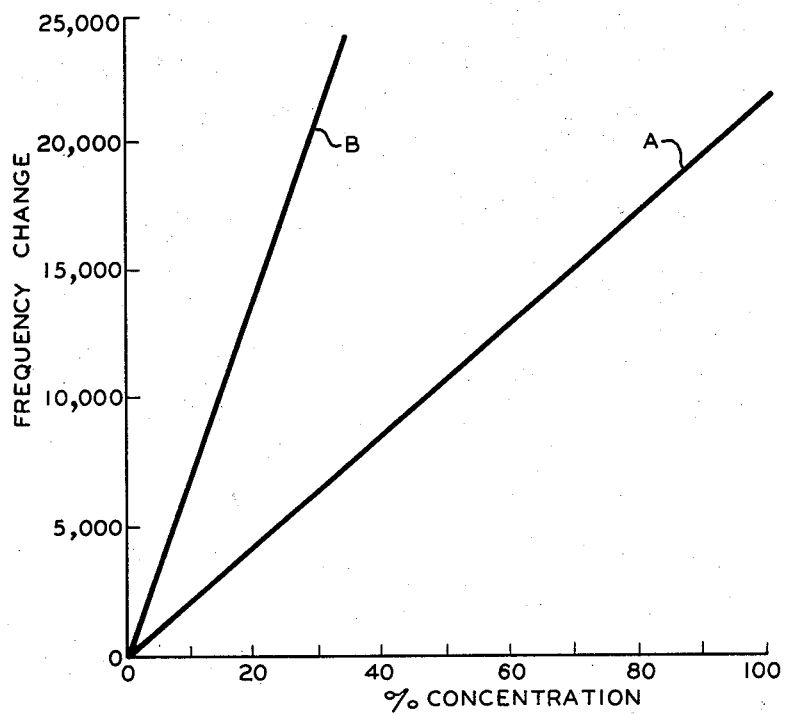
FIGURE 4 is a graphic ilustration of a measurement of the percent concentration of methane in helium carrier gas as a function of the difference frequency employing the composition sensing transducer of this invention.

In FIGURE 4, curve A was obtained with JED of 0.169 centimeter, while curve B was obtained with a JED of 0.19 centimeter. The corrected carrier gas flow rate was 3.41 ml./sec. and the RCL was 0.417 centimeter. It will be noted in both cases that the difference frequency is a linear function of the percent of concentration of the methane impurity in the carrier gas.

Figure 5:
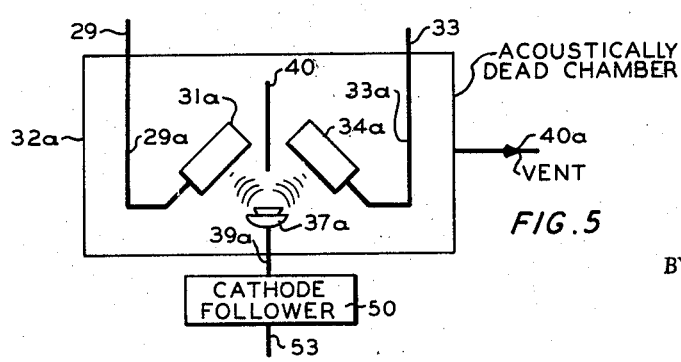
FIGURE 5 is a schematic diagram of a second embodiment of the composition sensing transducer circuit of this invention.

Referring now to FIGURE 5, there is shown a schematic diagram of a second embodiment directed to an alternate design for the transducer circuit. All of the elements are identical with those illustrated in FIGURE 1 down to and including the sample and reference generators, 31a and 34a, respectively. The subsequent differences in configuration from this point will be described in greater detail.

Generators 31a and 34a are positioned with their respective axes at right angles to one another, so that the waves emanating therefrom will converge at a common point. At this point a condenser microphone 37a is located. An acoustical baffle 40 is aligned with the microphone and equispaced between the generators and forms a 45° angle with axis of each. This baffle is provided to avoid "pulling" between the generators. Electrical lead 39a communicates between microphone 37a and a cathode follower 50, which is identical in function to those shown in FIGURE 3. The acoustically mixed signal is transmitted therefrom via lead 53 to subsequent amplification, and filtering, exactly as described in connection with the first embodiment.

This embodiment merely permits a reduction of the amounts of electronic circuitry, where the fluids being measured can be beat acoustically with reliable results, rather than by resort to electrical mixing as described in FIGURE 1.

Various other modifications and alterations of this invention will become apparent to those skilled in the art without departing from the scope and spirit of this invention and it should be understood that the latter is not necessarily limited to the aforementioned discussion.

We claim:

1. In a chromatographic analyzer including a chromatographic column, means to pass a carrier gas to the inlet of said column, and means to introduce a sample of material to be analyzed to the inlet of said column; apparatus to detect constituents of the sample material in the column effluent comprising first and second signal generators, each comprising means defining an orifice of rectangular cross section, a sharp edge positioned so that a gas stream flowing through said orifice impinges on said edge, and a resonant cavity disposed adjacent said sharp edge and perpendicular to a gas stream flowing through said orifice; means to direct the column effluent through the orifice of the first signal generator to impinge on the sharp edge thereof; means to pass carrier gas through the orifice of the second signal generator to impinge on the sharp edge thereof; first and second microphones positioned adjacent said first and second signal generators, respectively, to establish respective first and second signals, the frequencies of which are representative of the compositions of the gases passed through the orifices of the respective signal generators; means to heterodyne said first and second signals to provide an output signal representative of the difference in frequencies of said first and second signals; and means to measure said output signal.

2. In a chromatographic analyzer including a chromatographic column, means to pass a carrier gas to the inlet of said column, and means to introduce a sample of material to be analyzed to the inlet of said column; apparatus to detect constituents of the sample material in the column effluent comprising first and second signal generators, each comprising means defining an orifice of rectangular cross section, a sharp edge positioned so that a gas stream flowing through said orifice impinges on said edge, and a resonant cavity disposed adjacent said sharp edge and perpendicular to a gas stream flowing through said orifice; means to direct the column effluent through the orifice of the first signal generator to impinge on the sharp edge thereof; means to pass carrier gas through the orifice of the second signal generator to impinge on the sharp edge thereof; a microphone positioned adjacent said first and second signal generators so that sonic signals emitted therefrom impinge on said microphone so that an output signal is established by said microphone of a frequency which is equal to the difference between the frequencies of the sonic signals established by said first and second signal generators; and means to measure said output signal.

References Cited in the file of this patent

UNITED STATES PATENTS

| | | |
|---|---|---|
| 1,528,586 | Tate | Mar. 3, 1925 |
| 2,458,164 | Hill et al. | Jan. 4, 1949 |
| 2,492,371 | Sivian | Dec. 27, 1949 |
| 2,582,232 | Cesaro et al. | Jan. 15, 1952 |
| 2,788,656 | Sander | Apr. 16, 1957 |
| 2,794,341 | Vonnegut | June 4, 1957 |
| 2,809,520 | Richard | Oct. 15, 1957 |
| 2,952,153 | Robinson | Sept. 13, 1960 |